C. M. COTT.
INDEX.
APPLICATION FILED JAN. 29, 1914.

1,185,068.

Patented May 30, 1916.
3 SHEETS—SHEET 1.

Fig. 1.

| Surnames Aa-Ab-Ac-Ad. Given Names A to J Initial Letter of First Given Name and Page Numbers. | | | | | | | Surnames Aa-Ab-Ac-Ad. Given Names K to Z. Initial Letter of First Given Name and Page Numbers. | | | | | | |
|---|---|---|---|---|---|---|---|---|---|---|---|---|---|
| A-B | C | D | E | F-G | H-I-C | J | K-L | M | NO-PQ | R | S | T-UV | W-YZ |
| 1 | 3 | 5 | 7 | 9 | 11 | 13 | 15 | 17 | 19 | 21 | 23 | 25 | 27 |

The above pages indicate the proper place to look for name unless it is found among the names on the corresponding ruled spaces below.

Adams 29    Adams 29

Witnesses
R. E. Marshall
N. E. Eccleston

Inventor
C. M. Cott
By
Shepherd and Campbell
Attorneys

C. M. COTT.
INDEX.
APPLICATION FILED JAN. 29, 1914.

1,185,068.

Patented May 30, 1916.
3 SHEETS—SHEET 2.

GRANTOR INDEX TO DEEDS.

LOCATE NAME BY FRONT INDEX 1 (a)

| GRANTORS | | | GRANTEES | Vol. | Page | Date of Record | Kind of Instrument | LOCATION OF PROPERTY OR OTHER DESCRIPTION |
|---|---|---|---|---|---|---|---|---|
| Surnames | Given Name | Given Name | | | | | | |
| Addison | Andrew | | Chas. B. Clay | 40 | 425 | Nov. 7, 1838 | Deed | Lot 21 & from Hy |
| do —uf etal | Andrew | | Jos. A. Clapp | 72 | 516 | March 14, 1853 | Deed | Esgidal |
| do —uf etal | | Benj. | J.B.P. Belknap | 72 | 658 | Aug. 3, 1820 | Deed | Catherine St. |
| Aaron | Anna J. | | Exc. Mc. Savage etal | 22 | 105 | Aug. 31, 1820 | Invt. 28 | N. side Clay St. 100 a, |
| Ackerman | | | H. Goddin (Tr.) | 47 | 505 | May 23, 1844 | Invt. & | Lot 528 Richmond |
| do | | | H. Goddin (Tr.) | 47 | 50 | July 18, 1844 | | |
| Ackley | A. C. | | Jas. M. Cotton | 82 | 82 | June 2, 1875 | Deed | Lot in Fulton |
| do | Alex. J. | | | | | | | |
| Adamson | | B. F. | Thos. F. Allfriend | 44 | 465 | May 7, 1842 | Deed | Lot Q, St. |
| do | | B. F. | | | | | | |
| Abernathy | Andrew L. | | Jas. Folkes (Tr.) | 87 | 298 | Oct. 12, 1870 | Deed | 98 a. |

Witnesses
J.R. Woodworth
N.E. Eccleston

Inventor
C. M. Cott.

by
Shepherd & Campbell
Attorneys

THE COLUMBIA PLANOGRAPH CO., WASHINGTON, D. C.

C. M. COTT.
INDEX.
APPLICATION FILED JAN. 29, 1914.

1,185,068.

Patented May 30, 1916.
3 SHEETS—SHEET 3.

GRANTOR INDEX TO DEEDS.

LOCATE NAME BY FRONT INDEX 29

| GRANTORS | | GRANTEES | Vol. | Page | Date of Record | Kind of Instrument | Location of PROPERTY or OTHER DESCRIPTION |
|---|---|---|---|---|---|---|---|
| Surnames | Given Names | Given Names | | | | | |
| Adams | Richard | Isaac W. Adams | 1 | 21 | Oct. 1, 1782 | Deed | Lot 112 Richmond |
| do | Richard | Richard Adams Jr. | 1 | 21 | Feb. 1, 1782 | Deed | Lot 138 Richmond |
| do w/ et al | Robt. T. | Samuel | Richard Douglas | 1 | 114 | June 3, 1783 | Deed | 25-9-10-23-37-38 |
| do | | Sarah | Conrad & Co. | 1 | 150 | May 3, 1783 | Deed | Lot Richmond Lot 127 |
| do | Roger L. | | Wm. Paxton | 1 | 234 | July 4, 1784 | Deed | Lot Richmond |
| do | Silas | | Henry Logan | 1 | 240 | Oct. 5, 1784 | Deed | Lot 39 Richmond |
| do | A. J. | | Robt. W. Johnson | 1 | 246 | Nov. 4, 1784 | Deed | Lot 98 Richmond |
| do w/f | Rebecca | | Wm. Gibson | 1 | 249 | Apr. 5, 1785 | Deed | Lot 669 Richmond |
| do | | Samuel W. | Stephen Beckford | 2 | 164 | Aug. 3, 1785 | Deed | Lot 598 Richmond |
| do | Richard Jr. | | Thos. Bell | 2 | 222 | Feb. 6, 1786 | Deed | Lots 12-23-33 Richmond |
| do | | Samuel P. | Gabriel Morely | 2 | 244 | Feb. 6, 1786 | Deed | Lot 28 Richmond |
| do | Robt. T. | | Benn'l | 2 | 245 | June 6, 1786 | Deed | Farm McKinley |
| do | | Stewart Jr. | Henry Ash | 2 | 355 | Jan. 1, 1787 | Deed | 120-129 Richmond |
| do | Richard | | West Adams | 2 | 375 | Mar. 2, 1787 | Deed | Lots 151-152-169 Richmond |
| do w/f | Roger W. | | Mary Montgomery | 2 | 433 | Apr. 2, 1787 | Deed | |
| do | Richard M. | Sidney | Carl Wright | 3 | 214 | Feb. 7, 1789 | Deed | Tract Lot |
| do w/f | | | Robt. Pierce | 3 | 224 | Aug. 5, 1790 | Deed | Lot in Adamopolis |
| do | | Sidney E. | Robt. Pierce | 3 | 305 | Oct. 4, 1790 | Deed | 200 a. |
| do | | | Richard Adams Jr. | 3 | 423 | Apr. 4, 1791 | Deed | Hall |

Witnesses
J. R. Woodworth
N. E. Eccleston

Inventor
C. M. Cott by
Shephud Campbell
Attorneys

UNITED STATES PATENT OFFICE.

CHARLES M. COTT, OF COLUMBUS, OHIO.

INDEX.

1,185,068.  Specification of Letters Patent.  Patented May 30, 1916.

Application filed January 29, 1914. Serial No. 815,204.

*To all whom it may concern:*

Be it known that I, CHARLES M. COTT, citizen of the United States of America, residing at Columbus, in the county of Franklin and State of Ohio, have invented certain new and useful Improvements in Indexes, of which the following is a specification.

This invention relates to an improved index and it has for its object the provision of a device of this nature arranged to take care of all of the names to be indexed and provide the necessary means to accomplish this end, while at the same time keeping the number of volumes necessary for the purpose at the minimum.

Further objects and advantages of the invention will be hereinafter set forth.

The advantages of the herein described method of indexing will be more readily appreciated if existing conditions are thoroughly understood.

In some indexing systems heretofore employed it has been proposed to devote an entire sheet to each and every name. While this works out very well with names which occur very frequently, a great deal of space is wasted in the case of names which do not occur very frequently, and yet the devoting of an entire page or sheet to names which do occur frequently is highly desirable, and it is therefore an especial object of the present invention to provide a method or system of indexing in which the names are indexed in such manner that they demonstrate in compact form, the frequency of their occurrence, and when a name has so demonstrated that it occurs frequently enough, it is given a page or sheet to itself. The name taken for example in this instance is Richard Adams. The matter *e* indicates that the name Adams is to appear in Figure 1 while the letter R of matter C, indicates that if the given name begins with an R as in the present case, it must be placed within the column headed by the page number 21. Therefore, by referring to Fig. 3 which bears the page number 21 the name Richard Adams will be found. It is apparent that this is not all that is necessary but that in addition the system must be so arranged that during the time a name is demonstrating the frequency of its occurrence persons searching the indexes cannot by any means miss those names which have not up to that time occurred with such frequency as to entitle them to a separate page.

In carrying out the invention I provide, preferably in the form of a loose leaf book, a volume having, first, one or more index pages; second, a plurality of mixed group pages, each of which is subdivided to receive a series of groups of names, and third, a plurality of individual name pages.

In the accompanying drawing, Fig. 1 represents one of the index pages, Fig. 2 represents one of the mixed group pages, and Fig. 3 represents one of the individual name pages.

Referring to the drawing it will be seen that the index pages, shown in Fig. 1, a number of which are preferably provided, with which to take care of the entire alphabet, bear page numbers designated by the numerals indicated by the reference characters "*a*". These index pages are preferably horizontally ruled to provide spaces "*b*", for names to be arranged in vertical columns and each column is in turn headed by matter "C" indicative of the given name of the party indexed therein. Furthermore the sets of columns are designated by matter "*e*" indicative of the surnames to be placed therein and each set of columns bears matter "*f*" indicating that names not found in said columns but which from their alphabetical nature might be expected to be found there, are to be found upon the pages designated by indicia "*a*".

The method of use of this system and apparatus is as follows: Taking the name Andrew Addison for example, and turning to the index upon Fig. 1 and referring to the first and upper column in which this name would naturally be expected to be found, the searcher finds that this name is not indexed therein, but finds the matter "*f*," which directs him to page 1, of the mixed group pages. Referring now, to this page, one sees, Fig. 2, the name Addison is found and it will be seen that this page is ruled horizontally for the reception of names but that it is subdivided horizontally by the heavier lines 15, to provide the mixed group spaces 16. In the present instance these comprise three horizontal lines though it is apparent that any number of lines may be comprised within one of these mixed group spaces. The name Addison is indexed here until, from the frequency of its occurrence it fills the space allotted to it and demonstrates that it occurs frequently enough to justify the devotion of an entire page thereto. When the name Addison again occurs after this space has been filled, an entire page will be devoted thereto, and as many more pages as are necessary, and all of the matter appearing in the uppermost space 16, of page 1, may be transferred to the said page and the name Addison then, and not until then, written in the first column of Fig. 1, together with the number of the individual page devoted thereto whatever that number may happen to be. In Fig. 3, one of these individual name pages is illustrated which has been devoted to the name Adams, and it will be seen that in this case the name Adams appears in Fig. 1, followed by the number 29 which indicates the individual name page devoted to the name Adams; but it is only because the name Adams in this particular case has occurred with such frequency that it is given an individual name page and indexed in the index shown in Fig. 1. Usually, however, a searcher is directed by matter "*f*," as hereinbefore stated, to the proper mixed group page upon which the name sought may be found.

By virtue of the arrangement of sheets and the system, as herein set forth, I am enabled to index any and all names with a minimum loss of space, while at the same time the possibility that the searcher may overlook any names is carefully guarded against. It has been found, in actual practice, that less than one-tenth of the names, as a rule, occur with such frequency as to require the devotion of an individual name page thereto. From this the saving in space will be readily appreciated. This saving of space is not only advantageous from a monetary standpoint, but it saves a great deal of the confusion and annoyance arising from a multiplication of names on the index page.

It will readily be understood that the matter comprised in the three figures of the drawing constitutes a single unit of a complete index, in other words it relates only to surnames beginning with the letter A and takes care of no other letter of the alphabet. It will therefore be seen that each unit consists of a primary index shown in Fig. 1, a secondary index shown in Fig. 2, and an individual name page to which the primary and secondary indexes are each related.

The invention is not limited to the precise arrangement shown, for it is apparent that changes may be made without departing from the scope of the invention. For instance many different arrangements of the printed matter constituting the index shown in Fig. 1 may be resorted to and yet the spirit of the invention will not be departed from because it is in the relation of an index of this nature to what is shown in Figs. 2 and 3 that the invention resides, irrespective of the particular printed arrangement of any of the subject matter of these figures.

Having described my invention, what I claim is:

1. An index comprising a first page divided into spaces for the reception of names and page numbers, and bearing matter indicating where such names as are not but which by reason of their alphabetical nature ordinarily would be entered in such spaces, may be found, a plurality of second pages divided into a plurality of spaces in which such names as are not indexed upon the first named page are entered said second pages bearing numbers corresponding to the page numbers carried by the first named page, and a plurality of individual name pages arranged in such manner as to adapt them to have entered thereon such names as are found upon the first named page.

2. An indexing unit devoted to a single letter of the alphabet and comprising three distinct parts, first, a primary index, second, a secondary index and third an individual name page, the primary index being suitably formed to receive names of frequent occurrence together with the numbers of the individual name pages upon which such names of frequent occurrence are entered, and said primary index bearing primary indexing letters relating to the given names of the persons indexed upon such page, and the secondary index being formed to provide a plurality of groups of spaces in which such names as are not indexed upon the first named index are entered, said primary index bearing matter indicating that such names as are not but which by reason of their alphabetical nature ordinarily would be entered therein are to be found in the secondary index.

In testimony whereof I affix my signature in presence of two witnesses.

CHARLES M. COTT.

Witnesses:
 FRANK G. CAMPBELL,
 R. E. MARSHALL.

Copies of this patent may be obtained for five cents each, by addressing the "Commissioner of Patents, Washington, D. C."